(12) United States Patent
Fukuda et al.

(10) Patent No.: US 8,112,662 B2
(45) Date of Patent: Feb. 7, 2012

(54) PORTABLE ELECTRONIC APPARATUS, PROCESSING APPARATUS FOR PORTABLE ELECTRONIC APPARATUS, AND DATA PROCESSING METHOD IN PORTABLE ELECTRONIC APPARATUS

(75) Inventors: Aki Fukuda, Yokohama (JP); Saori Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 12/725,638

(22) Filed: Mar. 17, 2010

(65) Prior Publication Data

US 2010/0332916 A1 Dec. 30, 2010

(30) Foreign Application Priority Data

Jun. 30, 2009 (JP) ................................. 2009-155994
Jun. 30, 2009 (JP) ................................. 2009-155995

(51) Int. Cl.
*G06F 11/00* (2006.01)
(52) U.S. Cl. ............ 714/5.1; 714/6.31; 714/17; 714/25; 714/40; 714/44; 714/48; 714/49; 714/54
(58) Field of Classification Search .................. 714/5.1, 714/6.1, 6.11, 6.12, 6.31, 17, 21, 25, 40, 714/42, 44, 49, 54
See application file for complete search history.

(56) References Cited

U.S. PATENT DOCUMENTS

| 5,101,410 | A | * | 3/1992 | Niimura et al. .................. 714/45 |
| 5,418,353 | A | * | 5/1995 | Katayama et al. ............ 235/380 |
| 5,698,836 | A | * | 12/1997 | Fujioka .......................... 235/492 |
| 5,790,885 | A | * | 8/1998 | Shona ................................. 710/5 |
| 5,796,943 | A | * | 8/1998 | Fujioka ........................... 726/19 |
| 5,910,988 | A | | 6/1999 | Ballard |
| 6,012,143 | A | | 1/2000 | Tanaka |
| 7,437,610 | B2 | * | 10/2008 | Van Assche ..................... 714/25 |
| 7,828,218 | B1 | * | 11/2010 | De Jong ......................... 235/492 |
| 2002/0007433 | A1 | * | 1/2002 | Kusakabe et al. ............. 711/103 |
| 2002/0020744 | A1 | * | 2/2002 | Fukazawa ...................... 235/437 |
| 2002/0043565 | A1 | | 4/2002 | Hoshino et al. |
| 2004/0073846 | A1 | * | 4/2004 | Nakanishi et al. .............. 714/42 |
| 2005/0188250 | A1 | * | 8/2005 | Kurita et al. ...................... 714/5 |

(Continued)

FOREIGN PATENT DOCUMENTS

DE 19626339 1/1998

(Continued)

OTHER PUBLICATIONS

European Search Report dated Feb. 1, 2011.

(Continued)

*Primary Examiner* — Robert Beausoliel, Jr.
*Assistant Examiner* — Joshua P Lottich
(74) *Attorney, Agent, or Firm* — Pillsbury Winthrop Shaw Pittman, LLP

(57) ABSTRACT

A smart card comprises a storage unit in which various data are stored, a communication unit to perform data communication with an external apparatus, and a processing unit which executes processing corresponding to a command received via the communication unit. The processing unit of the smart card detects data judged to have data abnormality from the data stored in the storage unit in a case where the command received from the external apparatus is an abnormal data confirmation command, and notifies the external apparatus of response data including information indicating the data in which the data abnormality has been detected by the detection.

7 Claims, 12 Drawing Sheets

U.S. PATENT DOCUMENTS

| | | | |
|---|---|---|---|
| 2006/0143541 A1* | 6/2006 | Kay | 714/42 |
| 2007/0018003 A1 | 1/2007 | Jeong | |
| 2007/0237087 A1* | 10/2007 | Shimizu | 370/250 |
| 2009/0132852 A1* | 5/2009 | Sekiya | 714/15 |
| 2009/0240978 A1* | 9/2009 | Sudo | 714/6 |

FOREIGN PATENT DOCUMENTS

| | | |
|---|---|---|
| EP | 0973136 A2 | 1/2000 |
| EP | 1808834 A1 | 7/2007 |
| FR | 2635598 | 2/1990 |
| FR | 2663142 | 12/1991 |
| JP | 05-089305 | 4/1993 |
| JP | 11-282989 | 10/1999 |
| JP | 2006-072924 | 3/2006 |
| JP | 2007-257542 | 10/2007 |

OTHER PUBLICATIONS

Rankl und Effing; "Handbuch der Chipkarten"; Dec. 31, 2008; Hanser, Germany, XP002608913; pp. 23-503.

European Search Report dated Oct. 21, 2010.

* cited by examiner

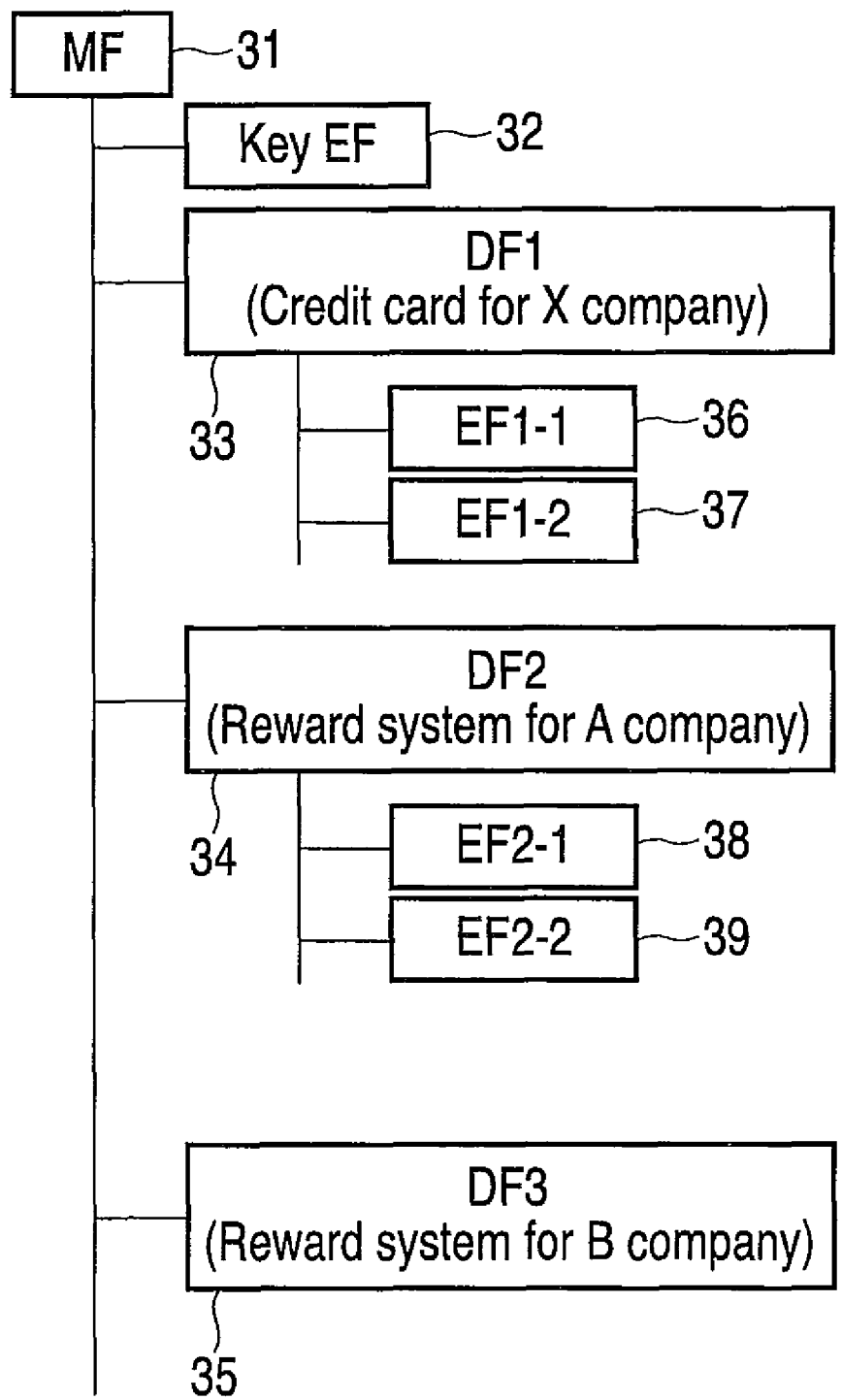
F I G. 3

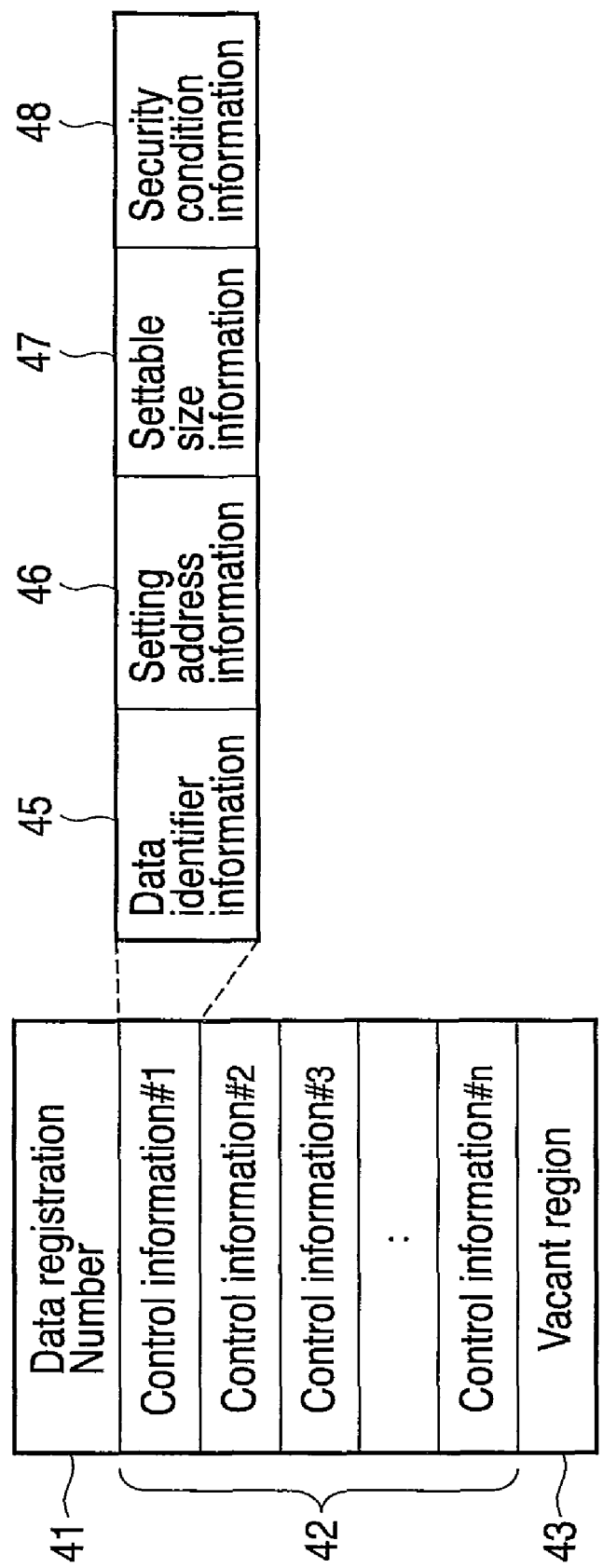
F I G. 4

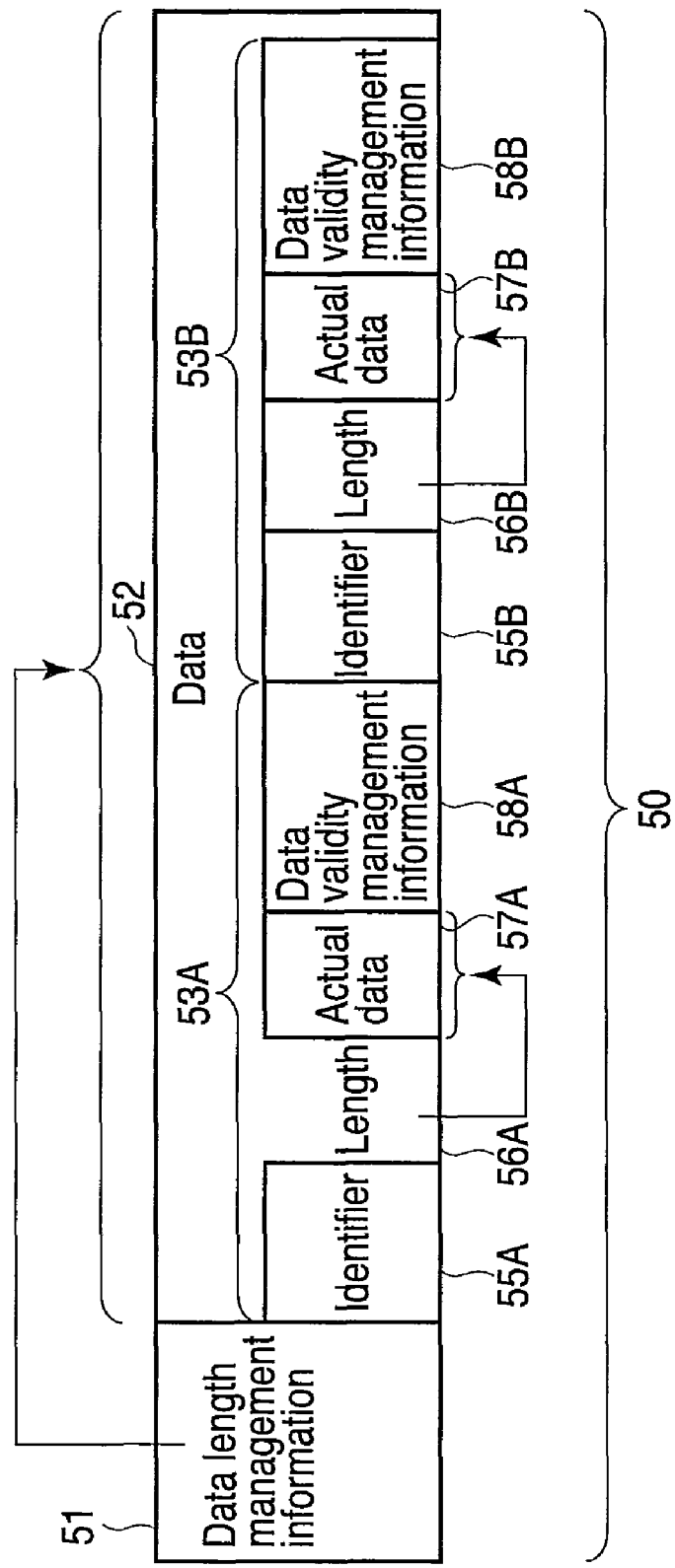
F I G. 5

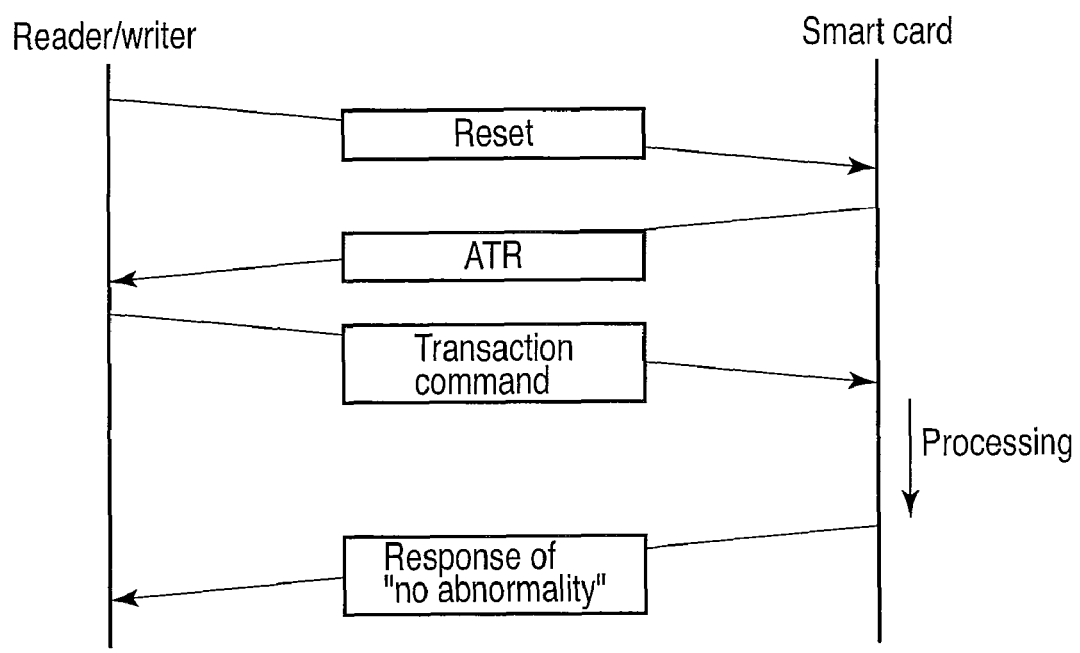
F I G. 6

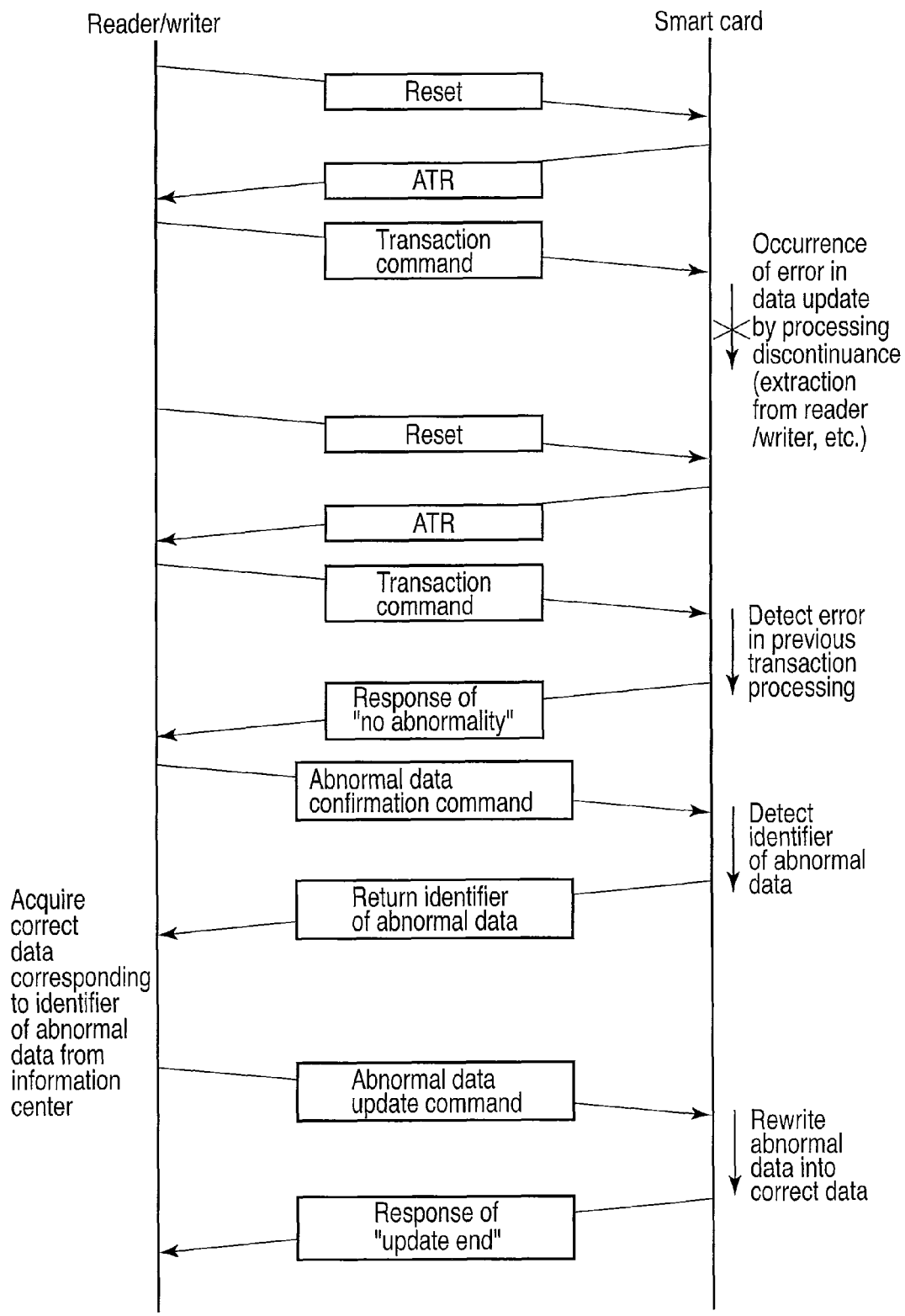
F I G. 7

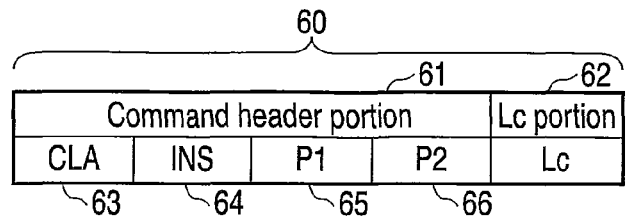
F I G. 8
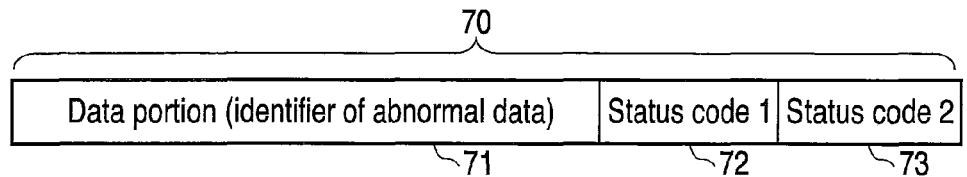
F I G. 9
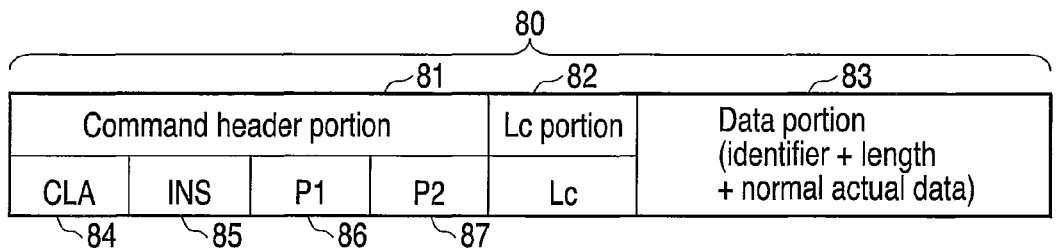
F I G. 10
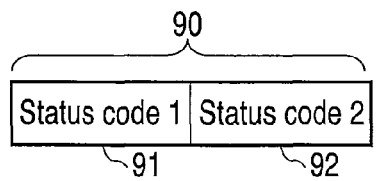
F I G. 11

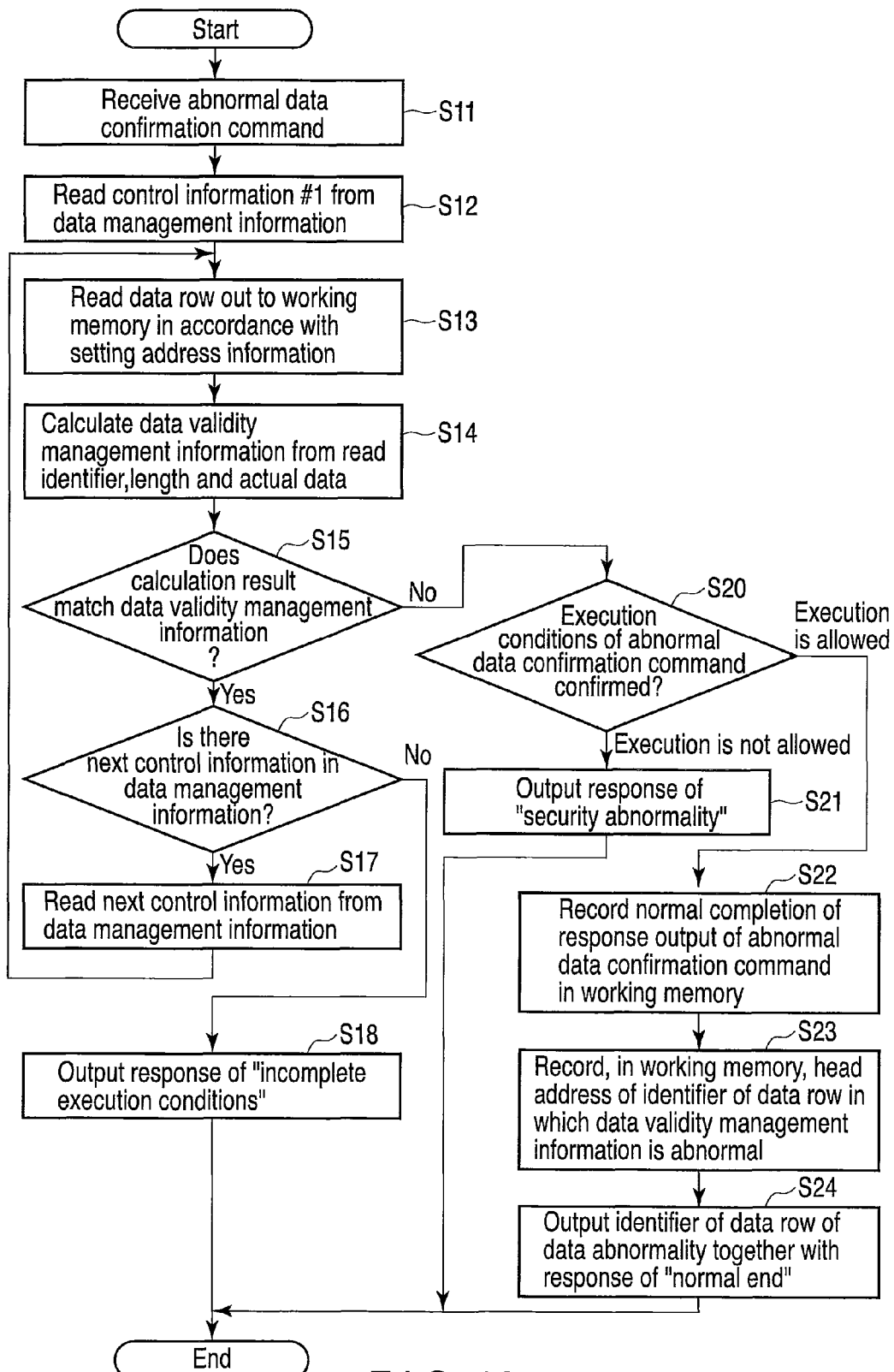
F I G. 12

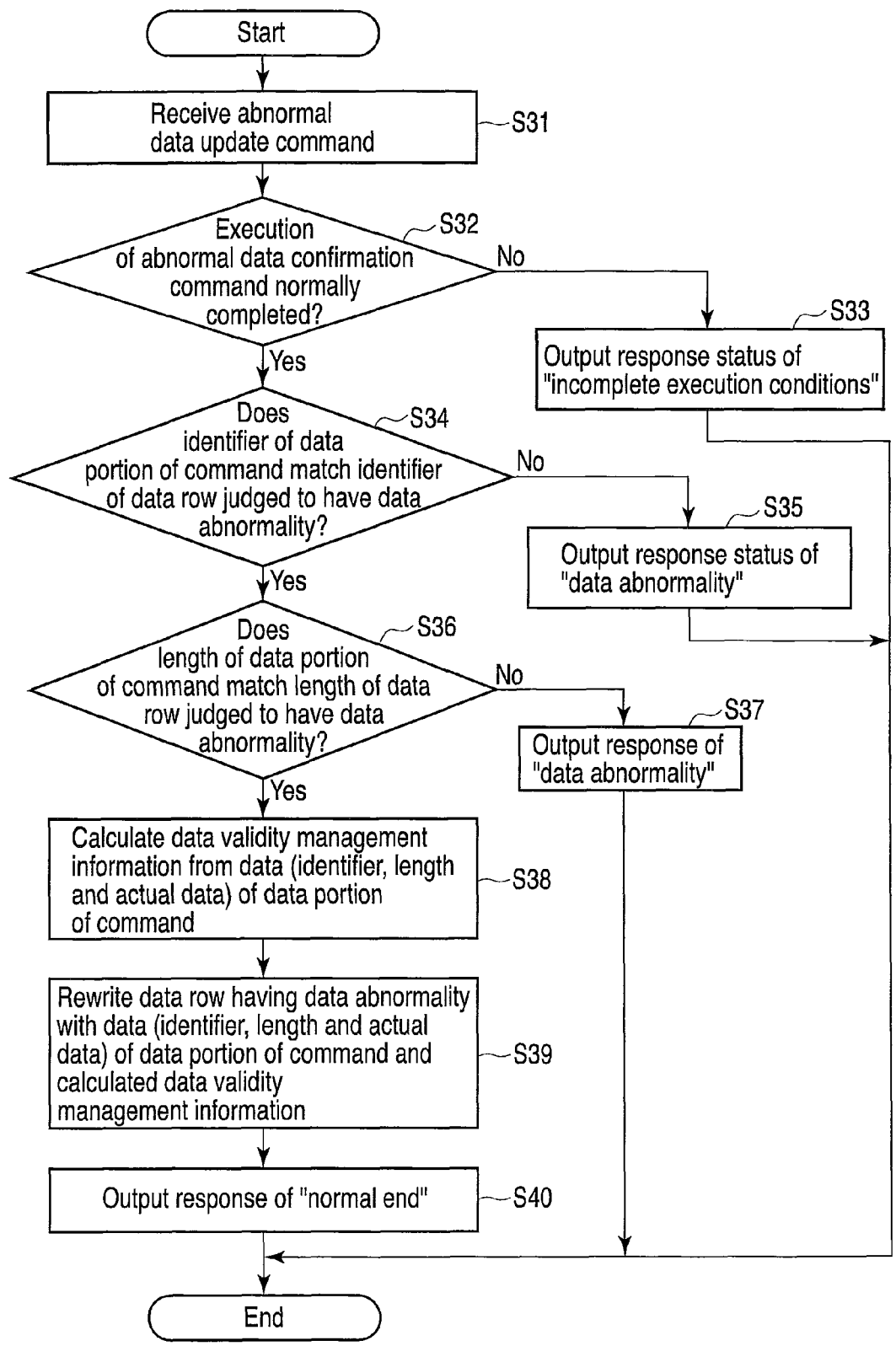
F I G. 13

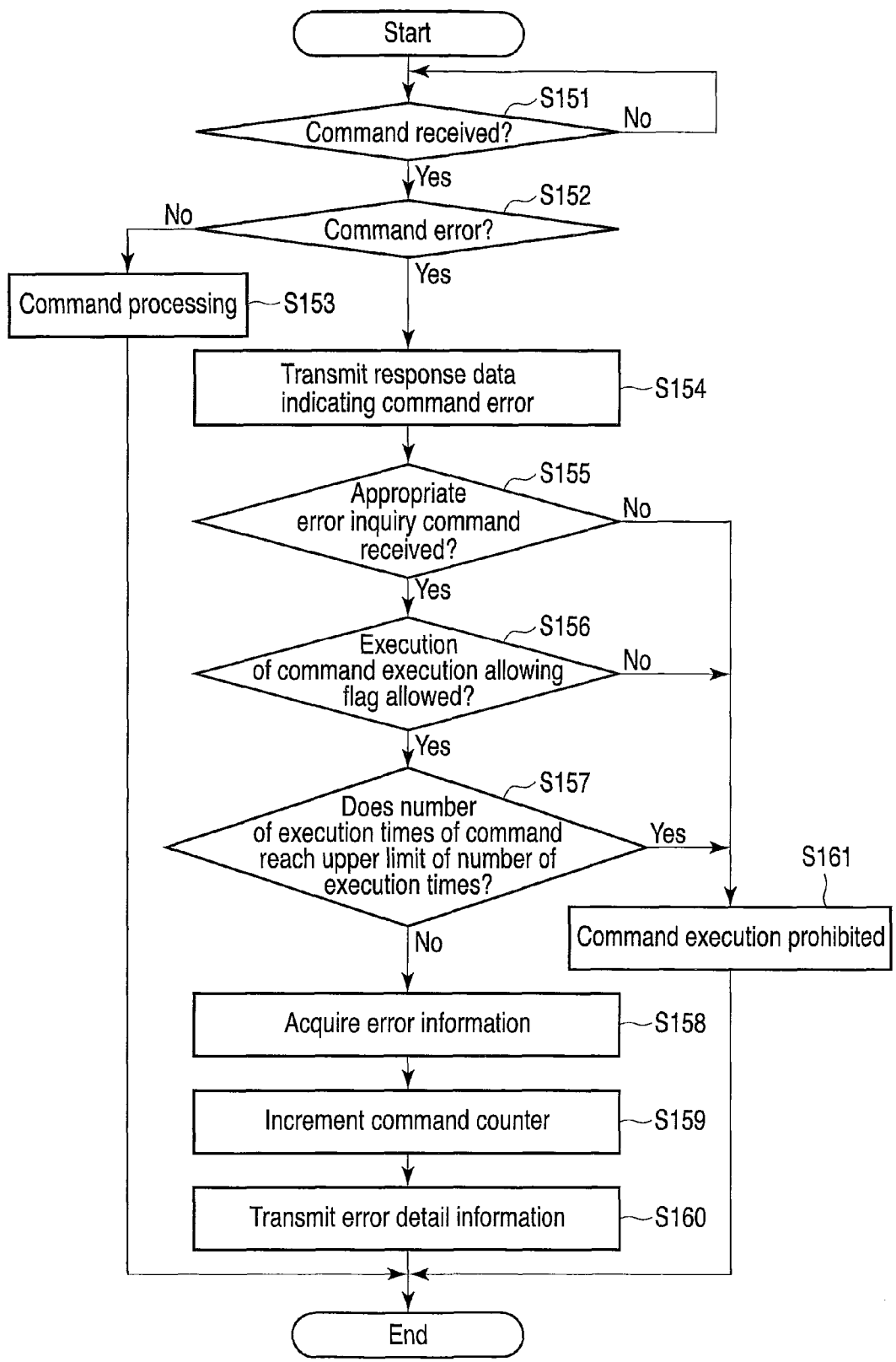
F I G. 18

PORTABLE ELECTRONIC APPARATUS, PROCESSING APPARATUS FOR PORTABLE ELECTRONIC APPARATUS, AND DATA PROCESSING METHOD IN PORTABLE ELECTRONIC APPARATUS

CROSS-REFERENCE TO RELATED APPLICATIONS

This application is based upon and claims the benefit of priority from prior Japanese Patent Applications No. 2009-155994, filed Jun. 30, 2009; and No. 2009-155995, filed Jun. 30, 2009, the entire contents of both of which are incorporated herein by reference.

BACKGROUND OF THE INVENTION

1. Field of the Invention

This invention relates to a portable electronic apparatus such as a smart card (IC card) in which an integrated circuit (IC) chip comprising a writable or rewritable nonvolatile memory, a CPU and the like is embedded and which executes various types of processing based on commands supplied from the outside, a processing unit of the portable electronic apparatus, and a data processing method in the portable electronic apparatus.

2. Description of the Related Art

In recent years, a smart card as a portable electronic apparatus has broadly spread in various fields. For example, the smart card has been used not only as a credit card, a cash card, a prepaid card, a reward card, a commuter pass or the like in payment of commercial transaction but also as an ID card such as an employee card, a membership card or an insurance card in various fields. In the smart card, an IC chip having a CPU, various memories, a communication interface and the like is embedded. In such a smart card, various data used for various use applications are stored in files of various types in a data memory. For example, in the smart card, log data indicating a history of transaction processing by use of the smart card is stored for each data row by using the file in which the data for the unit of the data row (record) is stored.

In general, the smart card executes processing corresponding to a command from an external apparatus while receiving supply of a power from a reader/writer which is the external apparatus. In such a smart card, if the supply of the power from the external apparatus is blocked during the execution of the processing, the processing is forcibly discontinued. For example, in a system which supplies the power from the reader/writer to the smart card set at a predetermined position, when the smart card is extracted from the above predetermined position, the supply of the power is blocked to forcibly discontinue the processing.

If the processing is discontinued during data update processing such as data writing or rewriting, the data is not updated to a correct state, and frequently has a breakdown state. In particular, the smart card of a contactless type is configured to receive the supply of the power from the reader/writer by radio communication. Consequently, in the smart card of the contactless type, the supply of the power is easily blocked during the processing, and there is a high possibility that the above data breakdown might occur. In a case where the data cannot be updated to the correct state, in the conventional smart card, it is judged that the breakdown of the data occurs, whereby a storage region of the data becomes unusable, or the smart card itself is discarded (replaced). However, in a configuration in which when the breakdown of the data occurs owing to a communication defect other than a security attack, the storage region of the data or the smart card itself is discarded, the smart card cannot efficiently be employed.

Moreover, the application of the smart card usually proceeds with a series of processing in accordance with a predetermined command order. Therefore, if an error is detected with respect to a predetermined command during the series of processing, the series of processing have to be performed again from the beginning. That is, when the error with respect to the predetermined command is detected during the series of processing, a processing efficiency is poor.

For example, a technology disclosed in Jpn. Pat. Appln. KOKAI Publication No. 2007-257542 is a technology which stores the upper limit value of the number of processing times to limit the number of the processing times. Even with the technology disclosed in Jpn. Pat. Appln. KOKAI Publication No. 2007-257542, it is difficult to improve the above poor processing efficiency.

BRIEF SUMMARY OF THE INVENTION

An object of one configuration of this invention is to provide a smart card which is excellent in processing efficiency during the occurrence of an error, a smart card processing apparatus, and a smart card processing system.

According to an aspect of the present invention, there is provided a portable electronic apparatus comprising a storage unit configured to store various data, a communication unit configured to perform data communication with an external apparatus, a detection unit configured to detect data having data abnormality in the data stored in the storage unit in a case where an abnormal data confirmation command is received from the external apparatus via the communication unit, and a notification unit configured to notify the external apparatus of response data including information indicating the data in which the data abnormality has been detected by the detection unit.

According to an aspect of the present invention, there is provided a portable electronic apparatus comprising a communication unit configured to communicate with an external apparatus, a detection unit configured to detect a command error due to a first command received from the external apparatus via the communication unit, a first transmission processing unit configured to transmit the command error to the external apparatus based on the detection of the command error by the detection unit, a second transmission processing unit configured to transmit command error information to the external apparatus based on a second command received from the external apparatus via the communication unit to inquire about the error, and a command processing unit configured to execute processing based on a third command corresponding to the first command received from the external apparatus via the communication unit to transmit an execution result to the external apparatus.

According to an aspect of the present invention, there is provided a processing apparatus for a portable electronic apparatus comprising a communication unit configured to communicate with the portable electronic apparatus, a first transmission processing unit configured to transmit a first command to the portable electronic apparatus via the communication unit, a first reception processing unit configured to receive response data indicating a command error due to the first command from the portable electronic apparatus via the communication unit, a second transmission processing unit configured to transmit a second command to inquire about the error to the portable electronic apparatus via the communication unit, a second reception processing unit configured to receive command error information from the portable electronic apparatus via the communication unit, and a command processing unit configured to transmit a third command corresponding to the first command to the portable electronic apparatus via the communication unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram showing a constitution example of a file stored in a data memory;

FIG. 4 is a diagram showing a constitution example of data management information;

FIG. 5 is a diagram showing a data format controlled (set) by control information;

FIG. 6 is a diagram for schematically explaining a communication procedure of the smart card and a reader/writer in a case where the smart card performs normal processing;

FIG. 7 is a diagram for schematically explaining a communication procedure of the smart card and the reader/writer in a case where an update error of data occurs in the smart card;

FIG. 8 is a diagram showing a constitution example of an abnormal data confirmation command;

FIG. 9 is a diagram showing a constitution example of response data with respect to the abnormal data confirmation command;

FIG. 10 is a diagram showing a constitution example of an abnormal data update command;

FIG. 11 is a diagram showing a constitution example of the response data with respect to the abnormal data update command;

FIG. 12 is a flow chart for explaining a flow of abnormal data confirmation processing;

FIG. 13 is a flow chart for explaining a flow of abnormal data update processing;

FIG. 18 is a flow chart showing a flow of processing in the smart card until the command is completed in the series of processing.

DETAILED DESCRIPTION OF THE INVENTION

Hereinafter, first and second embodiments of this invention will be described with reference to the drawings.

First, the first embodiment will be described.

Figure 1:
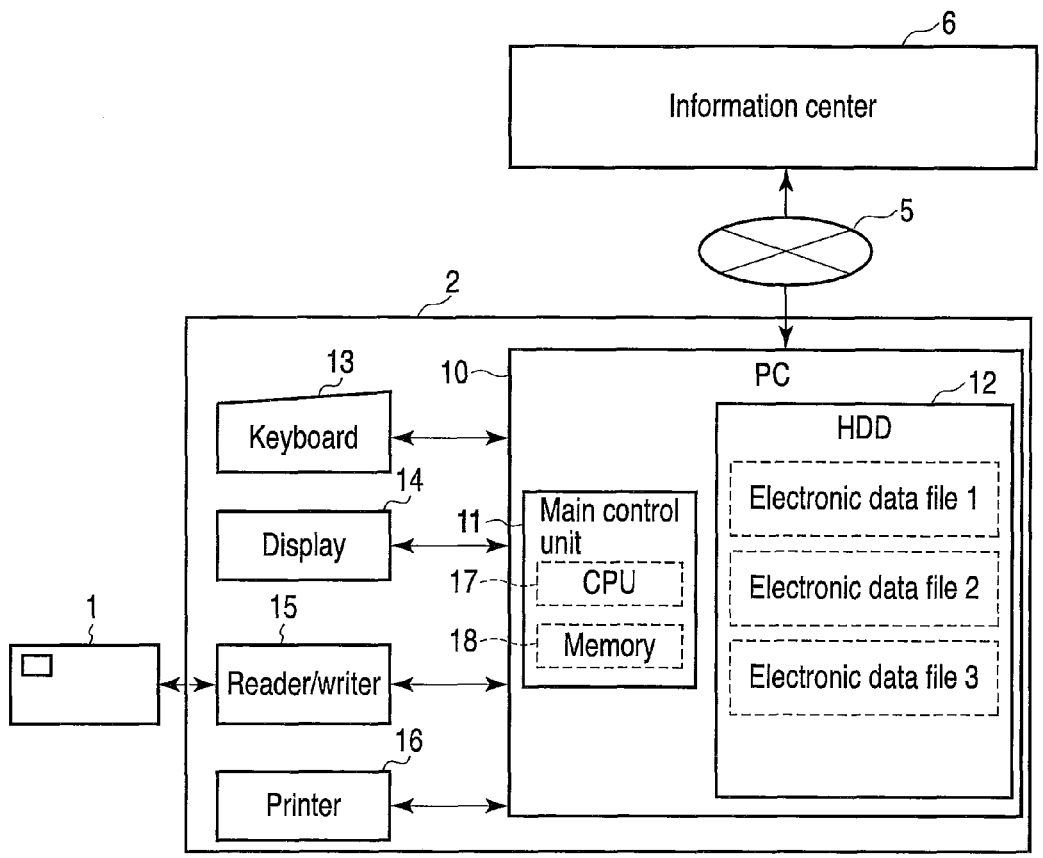
FIG. 1 is a diagram schematically showing a constitution example of a smart card processing system including a smart card (a portable electronic apparatus)

FIG. 1 schematically shows a constitution example of a smart card processing system including a smart card (a portable electronic apparatus) according to the first embodiment of the present invention.

As shown in FIG. 1, the present smart card processing system is constituted of a smart card 1, a smart card processing apparatus 2, a communication network 5, an information center 6 and the like. The information center 6 is connected to the smart card processing apparatus 2 via the communication network 5. The information center 6 is a server apparatus which generally manages data utilized in the present smart card system. In the present smart card system, the information center 6 functions as a superior apparatus with respect to the smart card processing apparatuses 2. Moreover, the communication network 5 is a communication network such as a public telephone network or a public radio communication network.

The smart card processing apparatus 2 is an apparatus mainly constituted of an electronic computer main body such as a personal computer (PC). In the smart card processing apparatus 2, a PC 10 comprises a main control unit 11 and a hard disk drive (HDD) 12 as a storage unit. In the smart card processing apparatus 2, the PC 10 is connected to a keyboard 13, a display 14, a reader/writer 15 and a printer 16. The PC 10 has a function of transmitting a command to the smart card 1 via the reader/writer 15, a function of performing various types of processing based on the data received from the smart card 1 and the like.

The main control unit 11 comprises a CPU 17, a memory 18 and the like. The CPU 17 is a unit which performs data processing such as calculation processing. The CPU 17 performs the data processing in accordance with a program. The memory 18 comprises a working memory in which data for an operation is temporarily stored, a program memory in which a program to be executed by the CPU 17, control data and the like are stored and the like. According to such a constitution, in the main control unit 11, the CPU 17 executes the program stored in the memory 18 to realize various types of processing.

The HDD 12 is a rewritable large-capacity nonvolatile memory. The HDD 12 functions as an auxiliary storage unit. For example, in the HDD 12, electronic data files 1, 2, 3, . . . are stored as confidential information. The data of these electronic data files stored in the HDD 12 can be transmitted to the smart card 1 via the reader/writer 15 under the control of the main control unit 11. The keyboard 13 functions as an operation unit which is operated by an operator of the smart card processing apparatus 2. The keyboard 13 is used by the operator to input various operating instructions, data or the like. The display 14 is a display unit which displays various pieces of information under the control of the PC 10.

The reader/writer 15 is an interface apparatus for communicating with the smart card 1. The reader/writer 15 is an external apparatus having an internal memory, a communication control unit and the like (not shown). Moreover, the reader/writer 15 is constituted of an interface corresponding to a communication system of the smart card 1. When the smart card 1 is, for example, a contact type smart card, the reader/writer 15 is constituted of a contact unit to be physically and electrically connected to a contact unit of the smart card 1 and the like.

Moreover, when the smart card 1 is a contactless type smart card, the reader/writer 15 is constituted of an antenna for performing radio communication with the smart card 1, a communication controller and the like. The reader/writer 15 performs, with respect to the smart card 1, power supply, clock supply, reset control, and transmission/reception of the data. By such functions, the reader/writer 15 performs the activation (start) of the smart card 1, the transmission of various commands, the reception of the acknowledgments of the transmitted commands and the like based on the control of the PC 10.

Next, a hardware constitution example of the smart card 1 will be described.

When the smart card 1 receives the supply of a power from the smart card processing apparatus 2 including the PC 10 and the like via the reader/writer 15, the card is activated (brought into an operable state). For example, when the smart card 1 has a contact type communicating function, that is, when the smart card 1 is a contact type smart card, the smart card 1 receives the supply of an operation power and operation clock from the reader/writer 15 via the contact unit as a communication interface.

Moreover, when the smart card 1 has a contactless type communicating function, that is, when the smart card 1 is a contactless type smart card, the smart card 1 receives electric waves from the reader/writer 15 via an antenna as the communication interface, a modulation/demodulation circuit or the like, and generates an operation power and operation clock from the electric waves by a power source unit (not shown), whereby the smart card 1 is activated.

When the IC processing system shown in FIG. 1 is applied to, for example, a payment system of a credit card or the like, that is, when the smart card 1 functions as the credit card, the smart card processing apparatus 2 corresponds to POS terminal or ATM. A user of the smart card (a card possessor) inputs an external input of personal identification number (PIN) or the like by use of the keyboard 13. Moreover, the smart card 1 stores an internal PIN for performing verification processing of matching/mismatching with respect to the external input PIN. Moreover, the smart card 1 can function not only as the credit card but also as, for example, a toll payment card of ETC (ETC card). That is, the smart card 1 can be applied to a plurality of applications.

Figure 2:
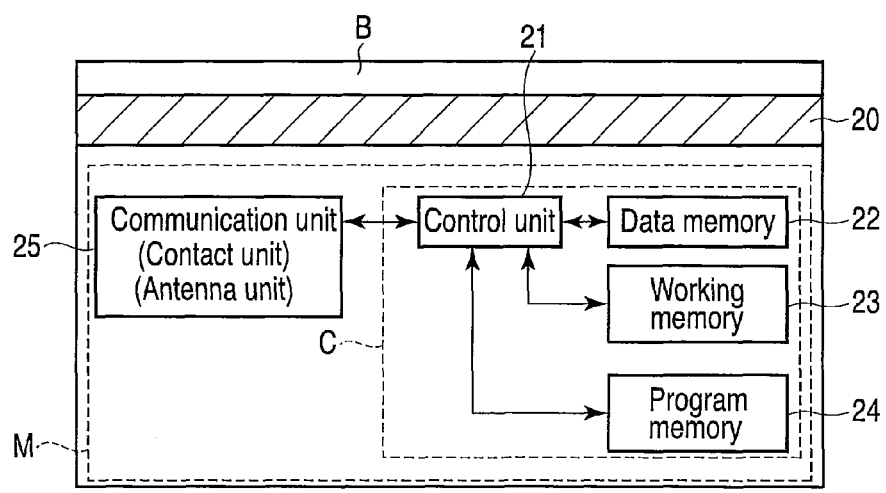
FIG. 2 is a block diagram schematically showing a hardware constitution example of the smart card.

FIG. 2 is a block diagram schematically showing a hardware constitution example of the smart card 1 according to the present embodiment.

In the smart card 1, a module M is embedded in a housing constituting a main body B. The module M is integrally formed by connecting at least one IC chip C to an external interface for communication (a communication unit), and embedded in the main body B of the smart card 1. Moreover, as shown in FIG. 2, the module M of the smart card 1 comprises a CPU (a control device) 21, a data memory 22, a working memory 23, a program memory 24, a communication unit 25 and the like. Furthermore, in a constitution example shown in FIG. 2, the main body B is provided with a magnetic stripe 20.

The CPU 21 controls the whole smart card 1. The CPU 21 operates based on the control program or the control data stored in the program memory 24 or the data memory 22 to realize various functions. The CPU 21 executes, for example, the program of an operating system to perform basic operation control of the smart card 1. Moreover, the CPU 21 executes an application program corresponding to the utilization purpose of the smart card 1 to perform various types of operation control in accordance with the operation mode of the smart card 1.

The data memory 22 is, for example, a nonvolatile memory such as an electrically erasable programmable read only memory (EEPROM) or a flash ROM, in which the data can be written and rewritten. The control program and various data corresponding to the use application of the operation of the smart card 1 are written in the data memory 22. In the data memory 22, various files corresponding to the standard of the smart card 1 are defined, and various data are written in the files. The example of the files stored in the data memory 22 will be described later.

The working memory 23 is a volatile memory such as an RAM. The working memory 23 also functions as a buffer for temporarily storing the data which is being processed by the CPU 21. In the working memory 23, for example, information indicating a file or application having a current state and the like are stored.

The program memory 24 is a nonvolatile memory such as a mask ROM in which the program for the control, control data and the like are beforehand stored. The program memory 24, in which the control program, the control data and the like are stored in a manufacturing stage of the smart card, is incorporated in the smart card 1. The control program or the control data stored in the program memory 24 controls the basic operation of the smart card, and is beforehand incorporated in accordance with the specifications of the smart card 1.

The communication unit 25 is an interface for communicating with the smart card processing apparatus 2 including the PC 10 via the reader/writer 15. When the smart card 1 is realized as the contact type smart card, the communication unit 25 is constituted of a communication control unit and a contact unit so that the units physically and electrically come in contact with the reader/writer 15 to transmit and receive signals. Moreover, when the smart card 1 is realized as the contactless type smart card, the communication unit 25 is constituted of a communication control unit such as the modulation/demodulation circuit for performing the radio communication with the reader/writer 15, the antenna for transmitting and receiving the electric waves and the like.

Hereinafter, the first embodiment applied to the smart card processing system having the above constitution will be described.

First, the files stored in the data memory 22 will be described.

FIG. 3 is a diagram showing a constitution example of the files stored in the data memory 22.

FIG. 3 shows the constitution example of a plurality of files in which information concerning a plurality of applications is stored. The file constitution shown in FIG. 3 is based on items defined in ISO/IEC7816-4. In the file constitution shown in FIG. 3, various files defined in ISO/IEC7816-4 are managed by a tree structure.

As shown in FIG. 3, in the data memory 22, there are defined the plurality of files having a hierarchical structure constituted of a master file (MF), a dedicated file (DF), an elementary file (EF) and the like. According to the example shown in FIG. 3, in hierarchies next to the uppermost hierarchy of a master file (MF) 31, a first EF (key EF) 32, a first DF (DF1) 33, a second DF (DF2) 34 and a third DF (DF3) 35 are present. Under the first DF (DF1) 33 and in hierarchies next to the DF1, a first EF (EF1-1) 36 of the DF1 and a second EF (EF1-2) 37 of the DF1 are present. Under the second DF (DF2) 34 and in hierarchies next to the DF2, a first EF (EF2-1) 38 of the DF2 and a second EF (EF2-2) 39 of the DF2 are present.

The MF 31 is positioned at the uppermost position of the file constitution with respect to various files stored in the data memory 22. The respective DFs (DF1, DF2 and DF3) are provided corresponding to the applications. Each DF functions as a folder corresponding to each application. In consequence, at least the DFs as many as the applications are defined in the data memory 22. Each EF is a data file in which actual data is stored. That is, in each EF under the DF, data used in the application corresponding to the DF is stored. Moreover, as shown in FIG. 3, the EF may be provided in a hierarchy right under the MF 31. The key EF 32 shown in FIG. 3 is a data file in which a key (key information) for establishing an access right and the like are stored.

Moreover, examples of the application corresponding to the DF include a credit, an ID card, and a reward system. In the example shown in FIG. 3, as the applications corresponding to the DFs, an application for X company (e.g., the DF of the credit card for X company), an application for A company (e.g., the DF of the reward system for A company) and an application for B company (e.g., the DF of the reward system for B company) are assumed. In the file constitution shown in FIG. 3, the applications for X, A and B companies are provided with DF1, DF2 and DF3, respectively. In this case, under the DF1, data used in the application for X company is stored in the EF1-1 and the EF1-2. Moreover, under the DF2, data used in the application for A company is stored in the EF2-1 and the EF2-2.

Next, a constitution example of data management information will be described.

FIG. 4 is a diagram showing the constitution example of the data management information.

Each data in the data memory 22 is managed by the data management information shown in FIG. 4.

Data management information 40 is stored in a management region of the data memory (EEPROM) 22. The data management information 40 is constituted of a data registration number 41, control information 42 and a vacant region 43.

The data registration number 41 is data indicating the total number of pieces of control information registered in the management region. The data of the data registration number 41 varies by addition and deletion of data (i.e., the control information) as a management target. The control information 42 is the registered control information (group). The vacant region 43 is a vacant region in which the control information can additionally be registered.

As shown in FIG. 4, the control information 42 is constituted of data identifier information 45, setting address information 46, settable size information 47, security condition information 48 and the like.

The data identifier information 45 is information indicating an identifier for identifying data (a data row). The data identifier information 45 is used when the external apparatus designates the data. When the smart card 1 receives, for example, a command to designate the identifier of the data as an access target from the reader/writer 15, the smart card 1 searches for the data identifier information 45 which matches the designated identifier, as the data of the access target. In consequence, the smart card 1 obtains, as the access target, the data of the data identifier information 45 which matches the designated identifier.

The setting address information 46 is information indicating an address (a head address) on the data memory 22 in which data having the identifier indicated by the data identifier information 45 is stored. That is, the data of the identifier indicated by the data identifier information 45 is disposed in the address on the data memory 22 indicated by the setting address information 46.

The settable size information 47 is information indicating the settable size of the data. That is, the data corresponding to the control information can be set with a variable length in a range defined by the settable size information 47. For example, when the range designated by the settable size information 47 is not satisfied (e.g., when a write command of the data exceeding the designated range is received), the access to the data is canceled (prohibited).

The security condition information 48 is information indicating security conditions with respect to the data. That is, the security condition information 48 indicates the security conditions to be satisfied when the data of the control information is accessed (read or written). For example, when the conditions indicated by the security condition information 48 are not satisfied, the access to the data is canceled (prohibited).

Moreover, in the present embodiment, as the security condition information 48, information is stored which indicates whether or not to execute an abnormal data confirmation command described later (or an abnormal data update command). As to the data which is not subjected to data update from the external apparatus even in the case of data abnormality, the security condition information 48 is set so that the execution of the abnormal data conformation command is not allowed. For example, as to data which prohibits any data update on any condition, the security condition information 48 is set so that the execution of the abnormal data confirmation command is not allowed.

However, unlike normal data update, the abnormal data update command described later is a command to be executed only when the security conditions described later are satisfied. That is, the abnormal data update processing described later is processing to be executed only while security properties are acquired. In consequence, even the data to allow the execution of the abnormal data confirmation command by the security condition information 48 is assumed to have high security properties of the data.

For example, as to data which is to be held as it is in a case of data abnormality (an error state), the security condition information 48 is set so that the execution of the abnormal data confirmation command is not allowed, and as to data which is to be rewritten into correct data in the case of the data abnormality (the error state), the security condition information 48 is set so that the execution of the abnormal data confirmation command is allowed.

Next, a constitution of the data will be described.

FIG. 5 is a diagram showing a data format controlled (set) by the above control information.

As shown in FIG. 5, data 50 is constituted of data length management information 51 and a data portion 52. The data 50 shown in FIG. 5 may be the whole data file or a record in the data file. The data length management information 51 is header information of the data, and is information indicating the size of the data portion 52 or the like. The data portion 52 is a data main body of the data.

In the constitution example shown in FIG. 5, in the data portion 52, a plurality of data rows 53 (53A, 53B) can be stored. In the example shown in FIG. 5, the data rows 53A and 53B are stored in the data portion 52. Each data row 53 (53A or 53B) comprises an identifier 55 (55A, 55B), a length 56 (56A, 56B), actual data 57 (57A, 57B) and data validity management information 58 (58A, 58B).

The identifier 55 is information for identifying the data row 53 in the data 50. The identifier 55 is the information which is unique to each of the data rows 53. The length 56 is information indicating the size of the actual data 57. That is, the data continued from the length 56 and having a data length indicated by the length 56 is the actual data 57 in the data row 53 identified by the identifier 55.

The actual data 57 is the entity (the main body) of the data in the data row 53. That is, when the identifier 55, the length 56 and the data validity management information 58 are the management information of the corresponding data row, the entity of the data managed by the management information is the actual data 57.

The data validity management information 58 is the management information for confirming the validity of the data row. The data validity management information 58 is used, for example, when the validity of the data row is confirmed by the exclusive OR of the identifier, length and actual data or the like, Next, a procedure of the access to the above data will be described.

First, the procedure of the access as normal processing of the data will be described.

FIG. 6 is a diagram for schematically explaining a communication procedure of the smart card 1 and the reader/writer 15 in a case where the smart card 1 performs the normal processing.

As shown in FIG. 6, on receiving a reset signal from the reader/writer 15, the smart card 1 returns an ATR signal to the reader/writer 15. The reader/writer 15 which has received the ATR signal from the smart card 1 successively transmits various transaction commands (various commands including a demand for the access to the data). In response to these transaction commands, the smart card 1 executes various types of processing including the control of data access. When the processing normally ends, the smart card 1 transmits a response indicating the normal end and the absence of abnormality to the reader/writer 15.

Next, a procedure of the access in the case of the occurrence of an error (the abnormality) in the processing of the data will be described.

FIG. 7 is a diagram for schematically explaining the communication procedure of the smart card 1 and the reader/writer 15 in a case where the update error of data occurs in the smart card 1.

As shown in FIG. 7, the smart card 1 receives the reset signal from the reader/writer 15, and returns the ATR signal to the reader/writer 15. The reader/writer 15 which has received the ATR signal from the smart card 1 successively transmits various transaction commands (various command including the demand for the access to the data).

It is assumed that an error occurs in the processing of the data update command among the transaction commands. For example, in a case where the supply of the power from the reader/writer 15 is forcibly stopped during data update processing (a case where the smart card 1 is extracted from a predetermined processing position or the like), an error occurs in the data update of the smart card 1. For example, when the update processing of the data row 53A shown in FIG. 5 has an error (when the rewriting of the actual data 57A is halfway discontinued), the actual data 57A indicates an abnormal value. In this case, the abnormal state of the data row 53A is judged by the confirmation of the validity based on the data validity management information.

When the reset signal is received again from the reader/writer 15 after the occurrence of the error in the data update, the smart card 1 returns the ATR signal to the reader/writer 15. The reader/writer 15 which has received the ATR signal from the smart card 1 successively transmits various transaction commands (various commands including the demand for the access to the data). On receiving such transaction commands, the smart card 1 notifies the reader/writer 15 of a response indicating that the previous transaction processing does not normally end (a response indicating that the abnormality is present).

On receiving, from the smart card 1, the response indicating that the previous transaction processing does not normally end, the reader/writer 15 transmits the abnormal data confirmation command to demand the confirmation of the presence/absence of the abnormal data. On receiving the abnormal data confirmation command, the smart card 1 performs processing to judge whether or not the data abnormality is present in each data row stored in the data memory 22. In a case where the data row having the data abnormality is found, the smart card 1 transmits, to the reader/writer 15, a response including the identifier indicating the data row having the data abnormality.

On receiving the information indicating the identifier of the abnormal data, the reader/writer 15 processes the data row having the abnormal data. For example, in a case where the information to be stored in the data memory 22 of the smart card 1 is managed by a superior apparatus (e.g., the information center 6 or the smart card processing apparatus 2) of the reader/writer 15, that is, in a case where the correct data to be written in the data row judged to be abnormal is managed by the superior apparatus, the reader/writer 15 receives, from the superior apparatus. the correct data to be written in the data row judged to be abnormal. On receiving the correct data to be written in the data row judged to be abnormal, the reader/writer 15 transmits, to the smart card 1, a command indicating that the data row judged to be abnormal is updated with the correct data (the abnormal data update command which is different from a usual data update command).

On receiving the abnormal data update command, the smart card 1 performs processing to update the designated data (the abnormal data) into the correct data. When the update of the data corresponding to the abnormal data update command is normally completed, the smart card 1 transmits a response indicating the update completion to the reader/writer 15. According to the above processing, in the smart card 1 and the smart card system, it is possible to securely confirm the data abnormality generated by the forced discontinuance of the processing in the data update processing. Furthermore, in the smart card 1 and the smart card system, it is possible to update, into the correct data, the data in which the data abnormality has been confirmed.

Next, the above abnormal data confirmation command will be described.

FIG. 8 is a diagram showing a constitution example of an abnormal data confirmation command 60.

The abnormal data confirmation command 60 shown in FIG. 8 is a telegraphic instruction message in a case where the reader/writer 15 instructs the smart card 1 to confirm the abnormal data as described above.

The abnormal data confirmation command 60 is constituted of a command header portion 61 and an Lc portion 62. Furthermore, the command header portion 61 is constituted of a command class (CLA) 63, an instruction (INS) 64, a first parameter (P1) 65 and a second parameter (P2) 66.

In the CLA 63 and the INS 64, information indicating that the command is the abnormal data confirmation command is stored. In the CLA 63 and the INS 64, code information associated with the abnormal data confirmation command is stored. The CPU 21 of the smart card 1 has a function of judging that the code information in the CLA 63 and the INS 64 is the abnormal data confirmation command. Such a function is realized, when the CPU 21 executes the program stored in the program memory 24.

The first parameter 65 and the second parameter 66 are information indicating the parameters of the abnormal data confirmation command. For example, in the first parameter 65 and the second parameter 66, the parameter is stored which indicates a range as an abnormal data confirmation target in a case where the range as the abnormal data confirmation target is limited. In the Lc portion 62, there is stored information indicating the length of the data in a case where the data is attached to the command. However, in the present embodiment, any data is not attached to the abnormal data confirmation command 60.

FIG. 9 is a diagram showing a constitution example of response data 70 with respect to the abnormal data confirmation command 60.

The response data 70 shown in FIG. 9 is a telegraphic response message output from the smart card 1 to the reader/writer 15 after executing the processing with respect to the abnormal data confirmation command from the reader/writer 15. The response data 70 is constituted of a data portion 71, a first status code 72 and a second status code 73. In the data portion 71, information indicating the identifier of the abnormal data is stored. In the status codes 72 and 73, there is stored a code indicating that the response data 70 is information which notifies the data row judged to be the abnormal data as an abnormal data confirmation result.

FIG. 10 is a diagram showing a constitution example of an abnormal data update command 80.

The abnormal data update command 80 shown in FIG. 10 is a telegraphic instruction message indicating that the reader/writer 15 requests the smart card 1 to execute the abnormal data update processing for updating the data judged to have the data abnormality into the correct data as described above.

The abnormal data update command 80 is constituted of a command header portion 81, an Lc portion 82 and a data portion 83. Furthermore, the command header portion 81 comprises a command class (CLA) 84, an instruction (INS) 85, a first parameter (P1) 86 and a second parameter (P2) 87.

In the CLA 84 and the INS 85, information indicating that the command is the abnormal data update command is stored. In the CLA 84 and the INS 85, code information associated with the abnormal data update command is stored. The CPU 21 of the smart card 1 has a function of judging that the code information in the CLA 84 and the INS 85 is the abnormal data update command. Such a function is realized, when the CPU 21 executes the program stored in the program memory 24. It is to be noted that the abnormal data update command is a command different from a usual data update command. Therefore, code information which is different from the usual data update command is defined with respect to the abnormal data update command.

The first parameter 86 and the second parameter 87 are information indicating the parameters of the abnormal data update command. For example, in the first parameter 86, there is stored EF-ID indicating EF as a data file in which a data row as the abnormal data update target is stored. Moreover, in the second parameter 87, an identifier indicating the data row as a rewriting target is stored.

In the Lc portion 82, information (Lc) indicating the length of the data attached to the command is stored. In the example shown in FIG. 10, the data of the whole data row to be updated is attached to the data portion 83 of the abnormal data update command 80. That is, the data stored in the data portion 83 is the data (identifier +length +normal actual data) of the whole data row to be updated. In the Lc portion 82, information indicating the length of the whole data stored in the data portion 83 is stored.

FIG. 11 is a diagram showing a constitution example of response data 90 with respect to the abnormal data update command 80.

The response data 90 shown in FIG. 11 is a telegraphic response message output from the smart card 1 to the reader/writer 15 after executing the processing with respect to the abnormal data update command 80 from the reader/writer 15.

The response data 90 is constituted of a first status code 91 and a second status code 92. The first status code 91 and the second status code 92 are information indicating the update result of the abnormal data with respect to the abnormal data update command 80. For example, when the processing to update the data row into the normal data is completed, codes indicating the completion of the update of the abnormal data are stored in the status codes 91 and 92 of the response data 90.

Next, abnormal data confirmation processing executed in response to the abnormal data confirmation command 60 as described above will be described in detail.

FIG. 12 is a flow chart for explaining a flow of abnormal data confirmation processing. It is to be noted that each processing shown in FIG. 12 is, for example, a function realized by executing the program stored in the program memory 24 by the CPU 21.

In a case where the CPU 21 of the smart card 1 receives the command from the reader/writer 15, the CPU confirms the CLA and the INS in the command header portion to judge the contents of the received command. Here, the CLA and INS in the command header portion of the received command are code information indicating the abnormal data confirmation command 60. That is, the smart card 1 has received the abnormal data confirmation command 60 (step S11).

When the CPU 21 receives the abnormal data confirmation command 60, the CPU reads a first piece of control information 42 (#1) from the data management information stored in the management region of the data memory 22 (step S12). On reading the first piece of control information 42, the CPU 21 reads, out to the working memory 23, the identifier 55, the length 56, the actual data 57 and the data validity management information 58 as the whole data row 53 corresponding to the control information 42 based on the setting address information 46 in the read control information 42 (step S13).

On reading the whole data row 53 onto the working memory 23, the CPU 21 performs predetermined calculation for confirming the validity of the data with respect to the identifier, length and actual data in the data row (step S14). This calculation is calculation (error check calculation) for calculating a value to be compared with the data validity management information. The contents of this calculation are not limited to a specific system. For example, the above calculation may be AND calculation of all the data, exclusive OR (XOR) calculation or CRC calculation. When the above calculation is completed, the CPU 21 compares the value calculated by the above calculation with a value read out as the data validity management information in the data row, to judge whether or not both the values meet each other (step S15).

In a case where it is judged as the result of the above comparison that both the values match each other (the step S15, YES), the CPU 21 judges that any data abnormality is not present in the data row corresponding to the control information. In this case, the CPU 21 judges whether or not the next control information is present (step S16). It is judged based on, for example, the data registration number and the number of the pieces of the read control information whether or not the next control information is present. In a case where it is judged that the next control information is present (the step S16, YES), the CPU 21 reads the next control information from the data management information (step S17). On reading the next control information, the CPU 21 returns to the step S13 to repeat the execution of the above processing. Moreover, in a case where it is judged that the next control information is not present (the step S16, NO), the CPU 21 transmits, to the reader/writer 15, response data (the telegraphic response message) in which the status code indicating that execution conditions are incomplete is set.

Moreover, in a case where it is judged as the result of the above comparison that the value calculated by the above calculation does not match the value of the data validity management information (the step S15, NO), the CPU 21 judges that the data abnormality is present in the data row corresponding to the control information. In this case, the CPU 21 confirms based on the security condition information 48 in the control information 42 whether or not the abnormal data confirmation command 60 can be executed with respect to the data row 53 corresponding to the control information 42 (step S20). For example, in a case where the abnormal data confirmation command 60 with respect to the data row cannot be executed (the step S20, the execution is not allowed), the CPU 21 transmits, to the reader/writer 15, the response data (the telegraphic response message) in which the status code indicating security abnormality is set (step S21).

Moreover, in a case where the execution of the abnormal data confirmation command 60 with respect to the data row is allowed (the step S20, the execution is allowed), the CPU 21 records, in the working memory 23, information indicating that the processing with respect to the abnormal data confirmation command (i.e., the abnormal data confirmation processing) is normally completed (step S22). This information recorded in the working memory 23 (the information indicating that the abnormal data confirmation processing has normally ended) is held until at least the abnormal data update command is executed as described later. This is because the normal end of the abnormal data confirmation processing is the execution condition of the abnormal data update processing described later.

When the information indicating the completion of the abnormal data confirmation processing is recorded in the working memory 23, the CPU 21 records, in the working memory 23, a head address of the data memory 22 in which the identifier of the data row is stored as the head address of the data row in which it is judged that the data is abnormal (step S23). Furthermore, based on the head address recorded in the working memory 23, the CPU 21 reads out the identifier of the data row which has been judged to have the data abnormality. On reading the identifier of the data row which has been judged to have the data abnormality, the CPU 21 sets, in the data portion 71, information indicating the identifier of the data row having the data abnormality, and transmits, to the reader/writer 15, the response data (the telegraphic response message) 70 in which the status code indicating that the abnormal data confirmation processing has normally ended is set (step S24).

Next, the abnormal data update processing executed in response to the abnormal data update command 80 as described above will be described in detail.

FIG. 13 is a flow chart for explaining a flow of abnormal data update processing. It is to be noted that each processing shown in FIG. 13 is a function realized, for example, when the CPU 21 executes the program stored in the program memory 24.

When the CPU 21 of the smart card 1 receives the command from the reader/writer 15, the CPU confirms the CLA and the INS in the command header portion to judge the contents of the received command. Here, it is assumed that the CLA 84 and the INS 85 in the command header portion 81 of the received command are code information indicating the abnormal data update command 80. That is, the smart card 1 has received the abnormal data update command 80 (step S31).

When the CPU 21 receives the abnormal data update command 80, the CPU 21 first judges whether or not the abnormal data confirmation command has normally ended (step S32). This judgment is executed by confirming a response situation with respect to the abnormal data confirmation command. When the above abnormal data confirmation processing has been performed, the information indicating that the abnormal data confirmation processing has normally ended is recorded in the working memory 23. Therefore, the CPU 21 confirms the information stored in the working memory 23 to confirm whether or not the abnormal data confirmation processing has ended.

The step S32 is processing to judge the execution conditions of the abnormal data update processing. In the present embodiment, the normal end of the abnormal data confirmation command is assumed as the execution condition of the abnormal data update processing. However, the execution conditions of the abnormal data update processing are not limited to the above example as long as security properties with respect to abnormal data update (e.g., the update of the data which cannot be updated with a usual data update command) can be acquired. For example, the abnormal data update processing may be executed on an execution condition that the abnormal data confirmation command has just normally ended. In this case, only in a case where the abnormal data update command is received from the external apparatus immediately after the external apparatus is notified of the normal end of the abnormal data confirmation command, the abnormal data update processing is started.

In a case where it is judged as the result of this confirmation that the abnormal data confirmation processing has not been executed (the step S32, NO), the CPU 21 transmits, to the reader/writer 15, a telegraphic response message in which a status code indicating that conditions for executing the abnormal data update processing are not satisfied (the execution conditions are incomplete) is set (step S33).

Moreover, in a case where it is judged by the above confirmation that the abnormal data confirmation processing has been executed (the step S32, YES), the CPU 21 confirms whether or not the data row designated by the received abnormal data update command (i.e., the data row as the target of the abnormal data update processing) is valid (step S34). That is, in the processing of the step S34, the CPU 21 compares the identifier of the data row stored in the data portion of the received abnormal data update command with the identifier of the data row judged to have the data abnormality by the abnormal data confirmation processing. In the above abnormal data confirmation processing, information indicating the head address of the identifier of the data row judged to have the data abnormality is recorded in the working memory 23. Therefore, the CPU 21 reads out the identifier of the data row judged to have the data abnormality, based on the head address recorded in the working memory 23. That is, the CPU 21 judges whether or not the read identifier matches the identifier stored in the data portion of the abnormal data confirmation command.

In a case where it is judged by the above judgment that the identifier of the data row judged to have the data abnormality does not match the identifier stored in the data portion of the abnormal data confirmation command (the step S34, NO), the CPU 21 transmits, to the reader/writer 15, response data (the telegraphic response message) in which the status code indicating that the abnormal data update processing is not allowed is set (step S35). In this case, the CPU 21 may notify that the identifier of the data row judged to have the data abnormality does not match the identifier of the data row designated by the abnormal data confirmation command. However, when there is a possibility of a problem in security, the response data 90 does not include information indicating a reason why the update processing is not allowed.

Moreover, in a case where it is judged by the above judgment that the identifier of the data row judged to have the data abnormality matches the identifier stored in the data portion 83 of the abnormal data update command 80 (the step S34, YES), the CPU 21 further confirms whether or not the length of the data row designated by the identifier is valid (step S36). In the processing of the step S36, the CPU 21 judges whether or not the length of the data for the update stored in the data portion 83 of the received abnormal data update command (i.e., the length of the abnormal data update command stored in the Lc portion 82) matches the length of the data row judged to have the data abnormality (the length of the data row in which the storage position of the identifier is specified by the head address recorded in the working memory 23).

In a case where it is judged by the above judgment that the length of the data for the update does not match the length of the data row judged to have the data abnormality (the step S36, NO), the CPU 21 transmits, to the reader/writer 15, the response data (the telegraphic response message) 90 in which the status code indicating that the abnormal data update processing is not allowed is set (step S37). In this case, the CPU 21 may notify that the length of the data row judged to have the data abnormality or the length of the data for the update designated by the abnormal data confirmation command is abnormal. However, when there is the possibility of the problem in the security, the response data 90 does not include information indicating a reason why the update processing is not allowed.

Moreover, in a case where it is judged by the above judgment that the length of the data for the update matches the length of the data row judged to have the data abnormality (the step S36, YES), the CPU 21 calculates the data validity management information by predetermined calculation (calculation for error check) with respect to the data for the update (the identifier, the length and the actual data) stored in the data portion 83 of the abnormal data update command 80 (step S38). In consequence, as the correct value of the data row judged to have the data abnormality, the identifier, the length, the actual data and the data validity management information are obtained.

When the data validity management information is calculated to obtain the correct value of the whole data row, the CPU 21 rewrites the whole data row judged to have the data abnormality into the identifier, the length, the actual data and the data validity management information obtained as the correct values of the data row (step S39). That is, the CPU 21 overwrites the data (the identifier, the length and the actual data) given as the data portion of the abnormal data update command and the data validity management information calculated by the predetermined calculation from the head address of the data row recorded in the working memory 23 and judged to have the data abnormality.

When the rewriting of the data with respect to the whole data row judged to have the data abnormality is completed as described above, the CPU 21 transmits, to the reader/writer 15, the response data (the telegraphic response message) 90 in which the status code indicating that the abnormal data update processing has normally ended is set (step S40).

As described above, in the first embodiment, when the command received from the reader/writer 15 is the abnormal data confirmation command, the smart card 1 detects the data row judged to have the data abnormality from the data rows stored in the data memory 22, and transmits, to the reader/writer 15, a response including the identifier indicating the data row in which the data abnormality has been detected, and indicating the normal end of the abnormal data confirmation processing. Furthermore, when the smart card 1 receives the abnormal data update command from the reader/writer 15 and the execution conditions of the abnormal data update processing are satisfied, the smart card executes processing to update the data judged to have the data abnormality into the correct data in accordance with the abnormal data update command. Examples of the execution conditions of the abnormal data update processing include a condition that the abnormal data confirmation processing has normally ended, and a condition that the abnormal data confirmation processing has just normally ended.

According to the above first embodiment, when the data abnormality occurs in the smart card 1 owing to the defect of the communication, the data judged to have the data abnormality can be updated to normal data. In consequence, even if the data abnormality occurs, the storage region of the data memory 22 in the smart card 1 or the smart card 1 itself is not wasted, and the efficient employment of the smart card 1 and the data region of the smart card 1 can be realized.

Next, a second embodiment will be described.

An smart card (a portable electronic apparatus) and a smart card processing system according to a second embodiment can be realized by a hardware constitution described in the first embodiment with reference to FIGS. 1 and 2. Therefore, in the second embodiment, the smart card (the portable electronic apparatus) and the smart card processing system have the hardware constitution shown in FIGS. 1 and 2, and hence detailed description thereof is omitted.

In the same manner as in the above first embodiment, a smart card processing apparatus 2 transmits various commands to a smart card 1 via a reader/writer 15, and receives a response from the smart card. Moreover, the smart card receives the command from the smart card processing apparatus 2, executes processing with respect to the received command, and returns the execution result of the processing as response data. In consequence, the smart card processing apparatus 2 records data in the smart card 1, or reads out the data stored in the smart card 1.

For example, when the smart card processing system shown in FIG. 1 is applied to a payment system of a credit card or the like, that is, when the smart card 1 is employed as the credit card, an external input PIN (i.e., the external input PIN input via a keyboard 13) input by a smart card user (a card possessor) is transmitted from the smart card processing apparatus 2 to the smart card 1 via the reader/writer 15. The smart card 1 receives the external input PIN transmitted from the smart card processing apparatus 2 via a communication unit 25, and temporarily stores the PIN in the working memory 23. A control unit 21 of the smart card 1 collates the external input PIN temporarily held in the working memory 23 and an internal PIN held in a data memory 22 to verify the matching/mismatching of both the PINs.

The control unit 21 of the smart card 1 transmits a verification processing result to the reader/writer 15 via the communication unit 25. A PC 10 displays, in a display 14, the verification processing result received from the smart card 1 via the reader/writer 15. The smart card user (the card possessor) refers to the contents of the display in the display 14 to confirm the verification processing result.

In the above application of the smart card 1, a plurality of predetermined commands are executed in accordance with an execution order to proceed with a series of processing sometimes. In such a series of processing, the smart card 1 confirms the effectiveness of each received command. When an invalid command (a command error) is detected during the series of processing, the smart card returns a response indicating that the command has the error to the smart card processing apparatus 2. When one invalid command is received in the series of processing in accordance with a command group to perform the series of processing again from the beginning, a processing efficiency lowers. To solve the problem, in the smart card processing system of the second embodiment, when the error is detected in the received command during the series of processing, the processing can be performed again from the received command.

During the series of processing, when the communication unit 25 of the smart card 1 receives a predetermined command from the smart card processing apparatus 2, the control unit 21 of the smart card 1 judges whether or not the command format of the received command is correct. This judgment is realized by executing the program for detecting the command format error stored in a program memory 24 by the control unit 21. In the program memory 24 of the smart card 1, for example, the correct format of each command is stored. In consequence, the control unit 21 judges whether or not the format of the received command is that of the correct command stored in the program memory 24.

When the smart card 1 detects the error in the received command, the smart card 1 transmits a command error response to the smart card processing apparatus 2. The smart card processing apparatus 2 transmits, to the smart card 1, an error inquiry command for inquiring about the details of the error based on the command error response received via the reader/writer 15. The communication unit 25 of the smart card 1 transmits error detail information to the smart card processing apparatus 2 based on the reception of the error inquiry command. The smart card processing apparatus 2 transmits, to the smart card 1, a modifying command to modify the error portion of the predetermined command based on the error detail information received via the reader/writer 15. The control unit 21 of the smart card 1 receives the modifying command to perform the series of processing again in the middle thereof based on the modifying command.

Furthermore, the control unit 21 of the smart card 1 stores the number of retry processing times based on the detection of the command error (e.g., the number of transmission times of the error detail information) and the upper limit of the number of retry times (e.g., the upper limit of the number of the transmission times of the error detail information). The number of the retry processing times (the number of the execution times of the command) is stored in a counter provided in the working memory 23. The upper limit of the number of the retry times (the upper limit of the number of the execution times of the command) is setting information, and is stored in, for example, the program memory 24. When the number of the retry processing times exceeds the upper limit of the number of the retry times, the control unit 21 of the smart card 1 does not allow the execution of the retry processing.

For example, in a case where the number of the retry processing times exceeds the upper limit of the number of the retry times, even if the control unit 21 of the smart card 1 receives the error inquiry command from the smart card processing apparatus 2, the control unit does not transmit the error detail information to the smart card processing apparatus 2. In consequence, the smart card processing apparatus 2 cannot receive the error detail information within a limit time, judges that the series of processing cannot be performed again in the middle thereof, and performs the series of processing again from the beginning. That is, the smart card processing apparatus 2 starts the transmission of the command to be first transmitted during the series of processing. However, the smart card 1 may notify the smart card processing apparatus 2 of the error detail information indicating that the retry is not allowed.

Moreover, the smart card 1 can limit (set) the upper limit of the number of the retry times to one with respect to a specific command in the series of processing. With such setting, when the processing with respect to the specific command fails twice, the smart card processing apparatus 2 performs the series of processing of the application again from the beginning.

Figure 14:
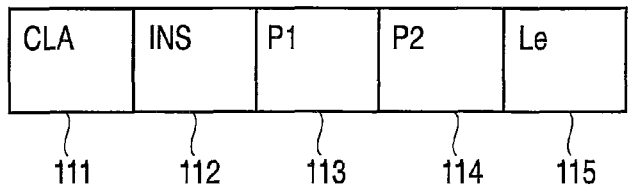
FIG. 14 is a diagram showing an example of the format of an error inquiry command.

FIG. 14 is a diagram showing an example of the format of the above error inquiry command. As shown in FIG. 14, the error inquiry command includes CLA (111), INS (112), P1 (113), P2 (114) and Le (115). The CLA is an abbreviation of class, INS is an instruction code, P1 is an instruction parameter, P2 is an instruction parameter, and Le is an abbreviation of length expected in the response data. The smart card processing apparatus 2 transmits this error inquiry command to the smart card 1 to inquire about the details of the error with respect to the smart card 1.

Figure 15:
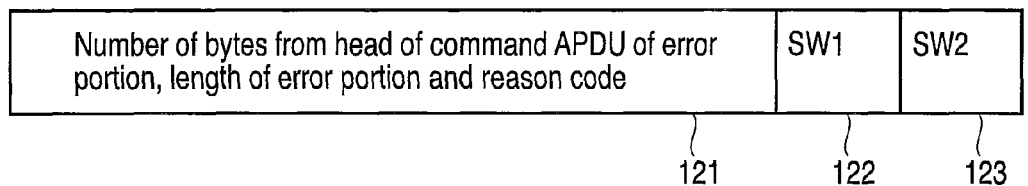
FIG. 15 is a diagram showing an example of the format of error detail response data.

FIG. 15 is a diagram showing an example of the format of error detail response data. The error detail response data includes error information (121), SW1 (122) and SW2 (123). The error information includes information indicating the error portion (the number of bytes from the head of command APDU, the length of the error portion) and information indicating an error reason (a reason code). The SW1 and SW2 indicate the processing result of the error inquiry command.

Figure 16:
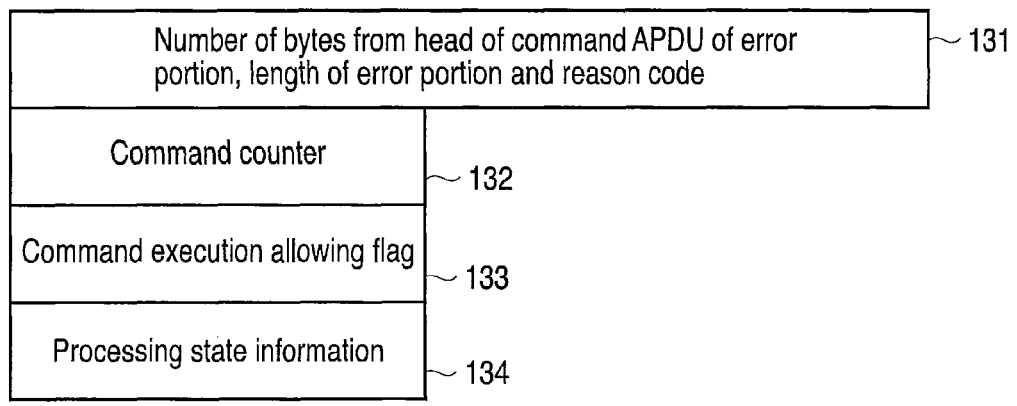
FIG. 16 is a diagram showing an example of error management information stored in a working memory.

FIG. 16 shows error management information stored in the working memory 23. As shown in FIG. 16, the error management information includes error information 131, a command counter 132, a command execution allowing flag 133 and processing state information 134.

The error information 131 is the same as the error information 121. That is, when the error is detected during the execution of the processing based on the predetermined command, the error information 131 indicating the details of the detected error is stored in the working memory 23. The command counter 132 manages the number of execution times of the error inquiry command and the upper limit of the number of the execution times. That is, the command counter 132 manages the number of transmission times of the error detail response data (the number of the execution times) based on the error inquiry command, and also manages the upper limit of the number. For example, the command execution allowing flag 133 is set to '1' until the number of the execution times of the error inquiry command exceeds the upper limit of the number of the execution times. When the number of the execution times of the error inquiry command exceeds the upper limit of the number of the execution times, the command execution allowing flag 133 is set to '0'.

The processing state information 134 is information indicating a state before the execution of the processing based on the predetermined command. The control unit 21 of the smart card 1 stores the state before the execution of the processing based on the predetermined command (the processing state information 134) in the working memory 23 based on the detection of the error of the predetermined command. That is, the control unit 21 of the smart card 1 stores the state before the execution of the processing (the state in the middle of the series of processing) in the working memory 23. In consequence, when the modifying command to modify the predetermined command is received, the control unit 21 of the smart card 1 can restart the processing based on the modifying command from the state before the execution of the processing based on the predetermined command (the state in the middle of the series of processing) in accordance with the processing state information 134.

Next, a flow of the command processing in the smart card processing system according to the second embodiment will be described.

First, the flow of the processing in the smart card processing apparatus 2 will be described.

Figure 17:
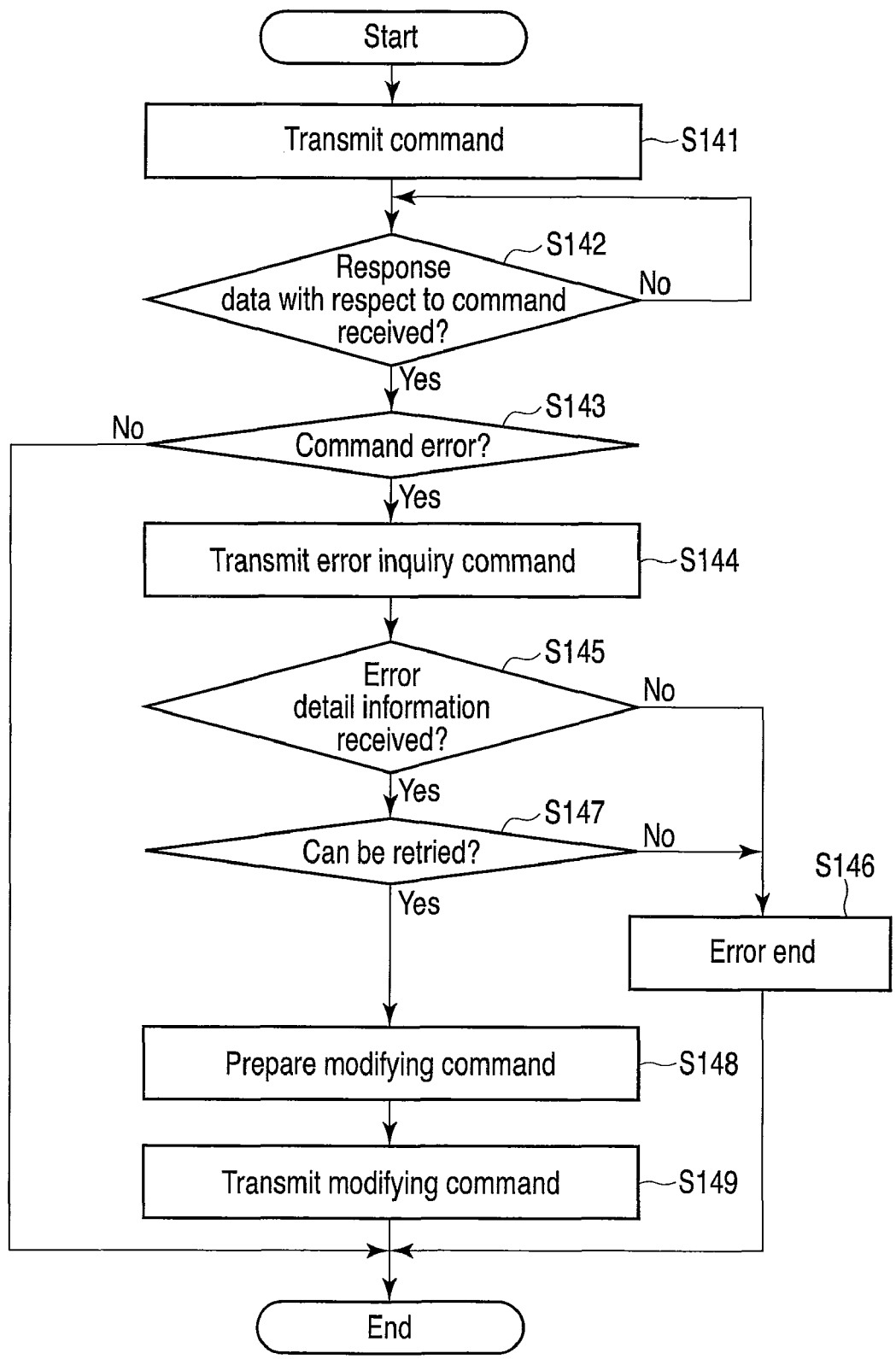
FIG. 17 is a flow chart showing a flow of processing in a smart card processing apparatus until one command is completed in a series of processing.

FIG. 17 is a flow chart showing the flow of the processing in the smart card processing apparatus 2 until one command is completed in the series of processing.

A main control unit 11 of the smart card processing apparatus 2 sets the command group for allowing the smart card 1 to execute the series of processing. When the command group for the series of processing is set, the main control unit 11 of the smart card processing apparatus 2 transmits the commands in order to the smart card 1 by use of the reader/writer 15. When one command is transmitted to the smart card 1 via the reader/writer 15 (S141), the main control unit 11 of the smart card processing apparatus 2 waits for the reception of the response data from the smart card 1 with respect to the command (S142).

On receiving the response data from the smart card 1 via the reader/writer 15 (S142, YES), the main control unit 11 of the smart card processing apparatus 2 judges based on the response data from the smart card 1 whether the command has ended normally or in error (S143). When the response data received from the smart card 1 indicates the normal end of the command (S143, NO), the main control unit 11 of the smart card processing apparatus 2 judges that the processing with respect to the command has normally ended. In this case, if there is a non-executed command in the command group for executing the series of processing, the main control unit 11 of the smart card processing apparatus 2 executes processing with respect to the next command.

Moreover, when the response data received from the smart card 1 indicates a command error (S143, YES), the main control unit 11 of the smart card processing apparatus 2 transmits the error inquiry command to the smart card 1 via the reader/writer 15 (S144). The error inquiry command is a command to demand the error detail information indicating the contents of the command error from the smart card 1. When the error inquiry command is transmitted to the smart card 1 via the reader/writer 15 (S144), the main control unit 11 of the smart card processing apparatus 2 waits for the reception of the response data (the error detail information) from the smart card 1 with respect to the error inquiry command (S145).

Here, when the error detail information as the response data from the smart card 1 with respect to the error inquiry command cannot be received (S145, NO), the main control unit 11 of the smart card processing apparatus 2 judges that the commands ends in error (S146). In this case, the main control unit 11 of the smart card processing apparatus 2 judges that the whole series of processing have the error. For example, when any response data cannot be received from the smart card 1 within a predetermined time, the main control unit 11 of the smart card processing apparatus 2 judges that the command ends in error.

On receiving the error detail information from the smart card 1 via the reader/writer 15 (S145, YES), the main control unit 11 of the smart card processing apparatus 2 analyzes the received error detail information to judge whether or not the command ended in error can be retried by the smart card 1 (S147). Here, in a case where it is judged by the error detail information received from the smart card 1 that the command ended in error cannot be retried (S147, NO), the main control unit 11 of the smart card processing apparatus 2 judges that the command ends in error (S146). In this case, the main control unit 11 of the smart card processing apparatus 2 judges that the whole series of processing end in error.

In a case where it is judged by the error detail information received from the smart card 1 that the command ended in error can be retried (S147, YES), the main control unit 11 of the smart card processing apparatus 2 prepares a correct command as the modifying command again (S148). When the modifying command is prepared, the main control unit 11 of the smart card processing apparatus 2 transmits the prepared modifying command to the smart card 1 via the reader/writer 15 (S149). When the modifying command is transmitted, the main control unit 11 of the smart card processing apparatus 2 returns to the above S143 to wait for the response from the smart card 1 with respect to the modifying command.

Next, a flow of processing in the smart card 1 will be described.

FIG. 18 is a flow chart showing the flow of processing in the smart card 1 until one command is completed in the series of processing.

As described above, on receiving the command from the smart card processing apparatus 2 (S151, YES), the control unit 21 of the smart card 1 judges whether or not there is an error in the received command (the command format error) (S152). When the command received from the smart card processing apparatus 2 has a correct format (S152, NO), the control unit 21 of the smart card 1 executes the processing corresponding to the command (S153).

Moreover, when the error is detected in the command received from the smart card processing apparatus 2 (S152, YES), the control unit 21 of the smart card 1 transmits the response data indicating the command error to the smart card processing apparatus 2 via the communication unit 25 (S154). On the other hand, the smart card processing apparatus 2 transmits, to the smart card 1, the error inquiry command to inquire about the details of the error based on the response indicating the command error received from the smart card 1 via the reader/writer 15.

On receiving the error inquiry command from the smart card processing apparatus 2, the control unit 21 of the smart card 1 checks the command format of the received error inquiry command (S155). When the command format of the received error inquiry command is not appropriate or when the error inquiry command cannot be received (S155, NO), the control unit 21 of the smart card 1 sets the command execution allowing flag 133 to '0' to prohibit the execution of the command (S161).

Moreover, when the command format of the received error inquiry command is appropriate (S155, YES), the smart card 1 checks the command execution allowing flag 133 (S156). When the command execution allowing flag 133 is set to, for example, '0' (S156, YES), the control unit 21 of the smart card 1 prohibits the execution of the command (S161). Moreover, when the command execution allowing flag 133 is set to '1' (S156, YES), the control unit 21 of the smart card 1 judges that the execution of the command is allowed. In a case where it is judged that the execution of the command is allowed, the smart card 1 checks the number of the execution times of the error inquiry command via the command counter 132 (S157).

When the number of the execution times of the command does not reach the upper limit of the number of the execution times of the command (S157, NO), the control unit 21 of the smart card 1 acquires the error information 131 (S158). On acquiring the error information 131, the control unit 21 of the smart card 1 increments the number of the execution times of the error inquiry command via the command counter 132 (S159). When the command counter 132 is incremented, the control unit 21 of the smart card 1 transmits the response data as the error detail information to the smart card processing apparatus 2 (S160).

Moreover, when the number of the execution times of the command reaches the upper limit of the number of the execution times of the command (S157, YES), the control unit 21 of the smart card 1 sets the command execution allowing flag 133 to '0' to prohibit the execution of the command (S161). In this case, the control unit 21 of the smart card 1 does not transmit response data such as the error detail information to the smart card processing apparatus 2. It is to be noted that the smart card 1 may transmit, to the smart card processing apparatus 2, the response data indicating that the command cannot be retried, instead of the error detail information.

Furthermore, as described above, the control unit 21 of the smart card 1 may store the state before the execution of the processing based on the predetermined command (the processing state information 134) based on the detection of the command error due to the predetermined command. For example, when the modifying command corresponding to the command judged to have the command error is received, the control unit 21 of the smart card 1 restarts the processing from the state before the execution of the command on a condition that the state before the execution (the processing state information 134) is stored. In a case where the control unit 21 of the smart card 1 receives the command which does not correspond to the command judged to have the command error (the command different from the modifying command), the control unit returns to the state before starting the series of processing on the condition that the state before the execution (the processing state information 134) is stored. That is, in the smart card 1, the restart of the series of processing in the middle thereof is prohibited, and the retry of the series of processing from the beginning or the execution of another processing is selected.

As described above, in the smart card processing system of the second embodiment, even if the error due to the predetermined command occurs during the series of processing, the series of processing can be performed again from the processing based on the predetermined command (the modifying command). In consequence, even if the error is generated during the series of processing, the series of processing can efficiently be performed.

For example, in a case where a plurality of mutual authentication processing times are necessary, when the error due to the predetermined command is generated during the N-th mutual authentication processing and the mutual authentication processing is performed again from the first time (the beginning), efficiency becomes very poor. With the application of the smart card processing system of the present embodiment, when such a plurality of mutual authentication processing times are necessary and the error due to the predetermined command is generated during the N-th mutual authentication processing, the processing can efficiently be performed.

Moreover, in a case where there is processing which requires a comparatively long time in the first half of the series of processing (read processing or write processing of data having a large size) and the error due to the predetermined command is generated in the latter half of the series of processing, when the series of processing is retried from the beginning, the efficiency becomes very poor. With the application of the smart card processing system of the present embodiment, even if the error due to the predetermined command is generated during the series of processing, the processing can efficiently be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic apparatus comprising:
a storage unit in which various data are stored;
a communication unit to perform data communication with an external apparatus;
a detection unit which detects data having data abnormality in the data stored in the storage unit in a case where an abnormal data confirmation command is received from the external apparatus via the communication unit;
a judgment unit which judges whether or not the confirmation of the data abnormality is allowed under security conditions corresponding to the data in which the data abnormality has been detected by the detection unit; and
a notification unit which notifies the external apparatus of security abnormality in a case where the judgment unit judges that the security conditions corresponding to the data in which the data abnormality has been detected are set so that the confirmation of the data abnormality is not allowed, and which notifies the external apparatus of the response data including the information indicating the data in which the data abnormality has been detected in a case where the judgment unit judges that the security conditions corresponding to the data in which the data abnormality has been detected are set so that the confirmation of the data abnormality is allowed.

2. A portable electronic apparatus comprising:
a storage unit in which various data are stored;
a communication unit to perform data communication with an external apparatus;
a detection unit which detects data having data abnormality in the data stored in the storage unit in a case where an abnormal data confirmation command is received from the external apparatus via the communication unit;
a notification unit which notifies the external apparatus of response data including information indicating the data in which the data abnormality has been detected by the detection unit
an execution condition judgment unit judges whether or not the external apparatus has been notified of the data designated by the abnormal data update command as the data in which the data abnormality has been detected, in a case where the abnormal data update command is received from the external apparatus via the communication unit; and
an abnormal data update unit which executes the abnormal data update demanded by the abnormal data update command, in a case where the execution condition judgment unit judges that the data designated by the abnormal data update command has been notified as the data in which the data abnormality has been detected.

3. The portable electronic apparatus according to claim 2, wherein the execution condition judgment unit judges whether or not the external apparatus has just been notified of the data designated by the abnormal data update command as the data in which the data abnormality has been detected, in a case where the abnormal data update command is received from the external apparatus via the communication unit, and the abnormal data update unit executes the abnormal data update demanded by the abnormal data update command, in a case where the execution condition judgment unit judges that the data designated by the abnormal data update command has just been notified as the data in which the data abnormality has been detected.

4. A portable electronic apparatus comprising:

a communication unit which communicates with an external apparatus;

a detection unit which detects a command error due to a first command received from the external apparatus via the communication unit;

a first transmission processing unit which transmits the command error to the external apparatus based on the detection of the command error by the detection unit;

a second transmission processing unit which transmits command error information to the external apparatus based on a second command received from the external apparatus via the communication unit to inquire about the error; and a command processing unit which executes processing based on a third command corresponding to the first command received from the external apparatus via the communication unit to transmit an execution result to the external apparatus.

5. The portable electronic apparatus according to claim 4, further comprising:

a first storage unit in which the number of retry processing times with respect to the one command based on the detection of the command error is stored;

a second storage unit in which the upper limit of the number of retry times with respect to the one command is stored; and an execution judgment unit which judges that the execution of retry processing is not allowed in a case where the number of the retry processing times exceeds the upper limit of the number of the retry times.

6. A processing unit for a portable electronic apparatus, comprising:

a communication unit which communicates with the portable electronic apparatus;

a first transmission processing unit which transmits a first command to the portable electronic apparatus via the communication unit;

a first reception processing unit which receives response data indicating a command error due to the first command from the portable electronic apparatus via the communication unit;

a second transmission processing unit which transmits a second command to inquire about the error to the portable electronic apparatus via the communication unit;

a second reception processing unit which receives command error information from the portable electronic apparatus via the communication unit; and a command processing unit which transmits a third command corresponding to the first command to the portable electronic apparatus via the communication unit.

7. A smart card comprising:

a storage unit in which various data are stored;

a communication unit to perform data communication with an external apparatus;

a detection unit which detects data having data abnormality in the data stored in the storage unit in a case where an abnormal data confirmation command is received from the external apparatus via the communication unit;

a judgment unit which judges whether or not the confirmation of the data abnormality is allowed under security conditions corresponding to the data in which the data abnormality has been detected by the detection unit; and a notification unit which notifies the external apparatus of security abnormality in a case where the judgment unit judges that the security conditions corresponding to the data in which the data abnormality has been detected are set so that the confirmation of the data abnormality is not allowed, and the notification unit notifies the external apparatus of the response data including the information indicating the data in which the data abnormality has been detected in a case where the judgment unit judges that the security conditions corresponding to the data in which the data abnormality has been detected are set so that the confirmation of the data abnormality is allowed.

* * * * *